US012627977B2

(12) United States Patent
Martinez-Salazar et al.

(10) Patent No.: US 12,627,977 B2
(45) Date of Patent: May 12, 2026

(54) SECURE KEY MANAGEMENT DEVICE, AUTHENTICATION SYSTEM, WIDE AREA NETWORK AND METHOD FOR GENERATING SESSION KEYS

(71) Applicant: HITACHI ENERGY LTD, Zürich (CH)

(72) Inventors: Harold Roberto Martinez-Salazar, Zürich (CH); Arijit Kumar Bose, Cracow (PL); Pawel Opoczyński, Małopolskie (PL)

(73) Assignee: HITACHI ENERGY LTD, Zurich (CH)

( * ) Notice: Subject to any disclaimer, the term of this patent is extended or adjusted under 35 U.S.C. 154(b) by 111 days.

(21) Appl. No.: 18/280,862

(22) PCT Filed: Jan. 20, 2022

(86) PCT No.: PCT/EP2022/051217
§ 371 (c)(1),
(2) Date: Sep. 7, 2023

(87) PCT Pub. No.: WO2022/189053
PCT Pub. Date: Sep. 15, 2022

(65) Prior Publication Data
US 2024/0163664 A1      May 16, 2024

(30) Foreign Application Priority Data

Mar. 8, 2021     (EP) ..................................... 21161344

(51) Int. Cl.
*H04W 12/04* (2021.01)
*H04L 9/08* (2006.01)

(52) U.S. Cl.
CPC ........... *H04W 12/04* (2013.01); *H04L 9/0819* (2013.01)

(58) Field of Classification Search
CPC ....... H04L 63/06; H04L 9/0819; H04L 9/083; H04L 9/0869; H04L 9/0897; H04W 12/04
See application file for complete search history.

(56) References Cited

U.S. PATENT DOCUMENTS 10,880,743 B1 * 12/2020 Berzin ................ H04L 41/0806
10,938,556 B2 * 3/2021 Bringer ................. H04L 63/061
(Continued)

FOREIGN PATENT DOCUMENTS

CN        107769834 B     5/2020
CN        108307355 B     7/2020
(Continued)

OTHER PUBLICATIONS

Notice of Reasons for Refusal, Japanese Patent Application No. 2023-554853, mailed Oct. 2, 2024, 6 pages.
(Continued)

*Primary Examiner* — Sharon S Lynch
(74) *Attorney, Agent, or Firm* — Sage Patent Group

(57) ABSTRACT

The present disclosure relates to a secure key management device for a wide area network comprising an end-device, a network server, an application server, and a join server. The secure key management device comprises a secure storage component for storage of secret key information, a secure interface for securely exchanging data with the join server, and at least one processing component. The processing component(s) is configured to generate and store at least one master key in the secure storage component; generate at least one root key, and provide the root key(s) to the end-device; receive a first request comprising the unique identifier of the end-device and session information; generate, based on the at least one master key and the unique identifier of the end-device and the session information
(Continued)

comprised in the first request, at least one session key; and provide the session key(s) to the join server.

15 Claims, 6 Drawing Sheets

(56) References Cited

U.S. PATENT DOCUMENTS

| | | | | |
|---|---|---|---|---|
| 11,212,314 | B2 * | 12/2021 | Fages-Tafanelli | .... H04L 63/102 |
| 11,218,873 | B2 * | 1/2022 | Bala | .................... H04L 63/0428 |
| 11,233,632 | B1 * | 1/2022 | Giuliano | ............... H04L 9/0825 |
| 11,233,771 | B2 * | 1/2022 | Hersent | ................... H04L 63/08 |
| 11,838,751 | B2 * | 12/2023 | Knapp | ................. H04W 12/06 |
| 2016/0044007 | A1 * | 2/2016 | Boudguiga | ............. H04L 9/083 |
| | | | | 713/171 |
| 2018/0227143 | A1 * | 8/2018 | Dottax | .................. H04L 63/102 |
| 2018/0288013 | A1 * | 10/2018 | Hennebert | ........... H04W 12/08 |
| 2019/0173669 | A1 * | 6/2019 | Bringer | ................ H04L 9/3242 |
| 2019/0394172 | A1 * | 12/2019 | Hersent | ................ H04L 9/0861 |
| 2020/0068390 | A1 * | 2/2020 | Knapp | ................. H04W 12/04 |
| 2020/0120132 | A1 * | 4/2020 | Fages-Tafanelli | ........................... |
| | | | | H04L 63/0876 |
| 2020/0177573 | A1 * | 6/2020 | Baier | ...................... H04L 67/52 |
| 2020/0288312 | A1 * | 9/2020 | Bala | .................... H04W 12/041 |
| 2022/0006644 | A1 * | 1/2022 | Bernsen | ................. G06F 21/44 |

FOREIGN PATENT DOCUMENTS

| | | | |
|---|---|---|---|
| CN | 112073115 | A | 12/2020 |
| EP | 3306970 | A1 | 4/2018 |
| JP | 2020028099 | A | 2/2020 |
| JP | 2020510334 | A | 4/2020 |
| KR | 20170042946 | A | 4/2017 |
| KR | 101827926 | B1 | 11/2017 |
| WO | 2018148244 | A1 | 8/2018 |
| WO | 2019001713 | A1 | 1/2019 |

OTHER PUBLICATIONS

International Search Report and Written Opinion of the International Searching Authority, PCT/EP2022/051217, mailed Apr. 13, 2022, 15 pages.

Naoui, Sarra, et al, "Trusted Third Party Based Key Management for Enhancing LoRaWAN Security", 2017 IEEE/ACS 14th International Conference on Computer Systems, and Applications (AICCSA), IEEE, XP033330036, Oct. 30, 2017, 8 pages.

Ribeiro, Victor, et al, "A Secure and Fault-Tolerant Architecture for LoRaWAN based on Blockchain", 2019 3rd Cyber Security in Networking Conference (CSNET), IEEE, XP033777371, Oct. 23, 2019.

* cited by examiner

Fig. 2

SECURE KEY MANAGEMENT DEVICE, AUTHENTICATION SYSTEM, WIDE AREA NETWORK AND METHOD FOR GENERATING SESSION KEYS

CROSS REFERENCE TO RELATED APPLICATIONS

This application is a 35 U.S.C. § 371 national stage application of PCT International PCT/EP2022/051217 filed on Jan. 20, 2022, which claims priority to European Patent Application 21161344.3, filed on Mar. 8, 2021, the disclosures and content of which are incorporated by reference herein in their entireties.

TECHNICAL FIELD

The present disclosure relates to devices, systems and methods for secure session key management.

BACKGROUND

US 2020/0288312 A1 discloses a communication system which includes a terminal, a telecommunications network server able to provide a network service to the terminal; and an application server able to provide application services to the terminal via the network and the network server.

WO 2018/148244 A1 discloses a key provisioning procedure, in which an application provider transfers a group master key to a network provider prior to device deployment. The key provisioning procedure may allow the network provider to authenticate a large number of devices in the system without the need to manage device unique keys.

U.S. Ser. No. 10/880,743 B1 describes techniques for a centralized, neutral system for Internet of Things (IoT) device activation and automatic onboarding on an end-to-end basis, and for establishing secure communication between IoT devices and the IoT platforms.

SUMMARY

It is an object to provide improved devices, systems and methods for secure management of keys in a wide area network.

According to a first aspect, a secure key management device for a wide area network comprising an end-device, a network server, an application server, and a join server is provided. The secure key management device comprises a secure storage component for storage of secret key information, a secure interface for securely exchanging data with the join server, and at least one processing component. The at least one processing component is configured to generate and store at least one master key in the secure storage component; generate, based on the at least one master key and a unique identifier of the end-device, at least one root key, and provide the at least one generated root key to the end-device; receive, from the join server via the secure interface, a first request comprising the unique identifier of the end-device and session information; generate, based on the at least one master key stored in the secure storage component, and the unique identifier of the end-device and the session information comprised in the first request, at least one session key; and provide the at least one session key via the secure interface to the join server.

Storage of a master key within a secure management allows to establish a centralized, secure environment for key management and storage. Root keys and session keys can be derived from the master key on-the-fly and provided over the secure interface to a join server, thus eliminating the need to store security critical data within remote or exposed components of the wide area network, such as the join server.

According to a second aspect, an authentication system for authenticating an end-device in a wide area network is provided, comprising a secure key management device according to the first aspect and a join server, connected to the secure key management device through the secure interface. At least one processing component of the join server is configured to receive, from the end-device, a second request comprising address information of the end-device; provide, via the secure interface to the secure key management device, the first request based the address information of the second request; and forward the at least one session key received via the secure interface from the secure key management device to at least one of the network server and the application server.

By requesting at least one session key on-demand from the secure key management device, the join server of the authentication system can respond to queries from the wide area network in a standard compliant way without local access to a root key.

According to a third aspect, a wide area network is provided, comprising an authentication system according to the second aspect, at least one end-device, at least one network server, and at least one application server. The at least one end-device is configured to send a data packet to the network server, the data packet being encrypted on a network layer and on an application layer; the at least network server is configured to decrypt the data packet on the network layer using at least one network session key received from the join server, and forward the partially decrypted data packet to the application server; and the at least application server is configured to decrypt the data packet on the application layer using at least one application session key received from the join server.

The above wide area network provides a high degree of network security by hiding security critical data, such as root keys, from intermediate network components, thus ensuring end-to-end security for the communication between the end-device and the application server.

According to a fourth aspect, a method for generating session keys for use in a wide area network is provided. The wide area network comprises an end-device pre-registered with a secure key management device, a network server, an application server and a join server. The method comprises receiving, by the secure key management device from the join server via a secure interface, a first request comprising a unique identifier of the end-device and session information; generating, by the secure key management device, based on at least one master key stored in the secure key management device, and the unique identifier of the end-device and the session information comprised in the first request, at least one session key; and providing, by the secure key management device, the generated at least one session key via the secure interface to the join server.

The above method allows the generation of session keys on-the-fly by a secure key management device.

According to a fifth aspect, a method for pre-registering an end device with a secure key management device for use in a wide area network is provided. The pre-registration procedure comprises generating, by the secure key management device, the at least one master key and storing the at least one master key within the secure key management device; generating, by the secure key management device, based on the at least one master key and a unique identifier of the end-device provided to the secure key management device, at least one root key; and providing the at least one generated root key to the end-device.

The method according to the fifth aspect may be used to pre-register an end-device with a secure key management device before performing the step of receiving the first request according to the fourth aspect.

According to a sixth aspect, a data storage device storing instructions that, when executed by at least one processing device of a networked computing device, implements the steps of the methods according to the fourth or fifth aspect.

According to at least one embodiment, the wide area network is a LoRaWAN network and the secure interface is configured for exchanging data with the join server outside an address space of the LoRaWAN network, thus hiding the secure key management device from the LoRaWAN network.

According to at least one embodiment, the step of generating the at least one master key is repeated after a predetermined condition. During the pre-registration procedure, version data related to the master key used for generating the at least one root key is provided to the end-device. In this embodiment, the first request received from the join server further comprises the version data.

Changing and tracking version data of a master key, for example after a predetermined amount of time or after a security breach, allows to limit the impact of compromised keys, thus further enhancing cyber security.

According to at least one embodiment, the address information of the second request comprise an end-device address identifier of the end-device. During the pre-registration procedure, the unique identifier of the end-device, the end-device address identifier, and, optionally, version data related to the master key used for generating the at least one root key is provided to the join server. The join server maps the end-device address identifier comprised in the second request to the unique identifier of the end-device, and generates the first request based on the mapping of the end-device address identifier to the unique identifier, thus hiding the end-device address identifier from the secure key management device.

Further aspects and embodiment of the disclosure are provided in the attached claims.

The devices and systems described above and in the attached claims are suitable for a method for generating session keys. Features and advantages described in connection with the devices and systems can therefore be used for the method and vice versa. The present disclosure comprises several aspects. Every feature described with respect to one of the aspects is also disclosed herein with respect to the other aspect, even if the respective feature is not explicitly mentioned in the context of the specific aspect.

BRIEF DESCRIPTION OF DRAWINGS

The accompanying figures are included to provide a further understanding. In the figures, elements of the same structure and/or functionality may be referenced by the same reference signs. It is to be understood that the embodiments shown in the figures are illustrative representations and are not necessarily drawn to scale.

FIG. 2 is a schematic sequence diagram of steps of various methods according to embodiments of the disclosure.

DETAILED DESCRIPTION

While the disclosure is amenable to various modifications and alternative forms, specifics thereof have been shown by way of example in the figures and will be described in detail. It should be understood, however, that the intention is not to limit the disclosure to the particular embodiments described. On the contrary, the intention is to cover all modifications, equivalents, and alternatives falling within the scope of the disclosure defined by the appended claims.

The purpose of this disclosure is to document an improved system and method for initializing, generation and provisioning of the root key in a wide area network, such as a low power and wireless based LoRaWAN based system.

By way of example, this section provides a background of the workflow of LoRaWAN based system and on the existing challenges in its key management. The focus of this disclosure is to address this existing challenge to improve cyber security.

Figure 1:
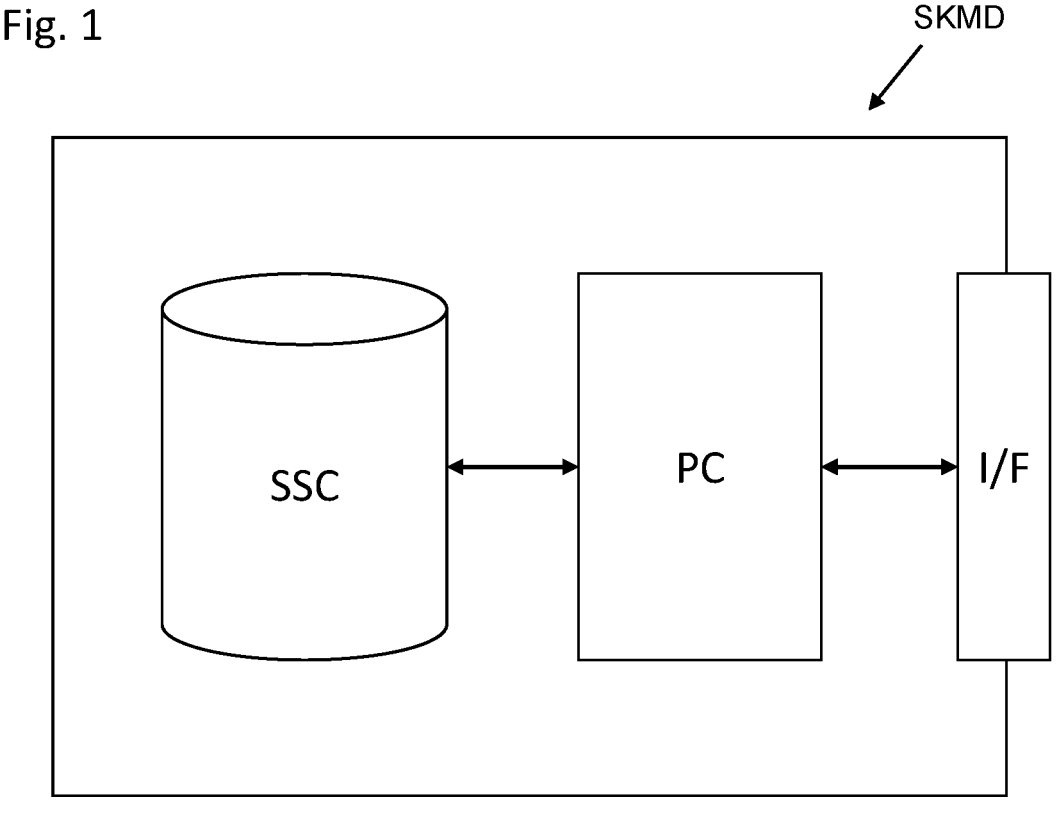
FIG. 1 is a schematic block diagram of a secure key management device according to an embodiment of the disclosure.

FIG. 1 shows a schematic block diagram of secure key management device SKMD according to an embodiment of the disclosure. The secure key management device SKMD comprises a secure storage component SSC for storage of secret key information, a processing component PC for executing stored instructions and a secure interface I/F for securely exchanging data with other entities, such as a join server of a wide area network (WAN).

In the described embodiment, the secure key management device SKMD may be implemented as a server computer comprising conventional components suitable for storing and executing program instructions, when the server computer is deployed in one or several data networks. The secure storage component SSC may be part of a hardware secure module (HSM) designed to securely store security critical information, such as private encryption keys and/or other secret key information and parameters. A HSM is protected against unauthorized data access and typically also comprises a processing component configured to perform cryptographic functions. In this way, security critical information, such as private keys, may never leave the HSM during operation of the secure key management device SKMD.

In the described example, parts or all of the processing component PC are also part of the HSM. For example, a first part of the processing component PC may reside within the HSM, and a second part of the processing component PC used to perform non-security critical operations, such as receiving or transmitting already encrypted data packets, may be implemented by different parts of the server computer.

In the described example, the secure interface I/F may be a network interface or a user console, or a combination thereof. For example, conventional networking equipment protected by a standard encryption method based on a private key stored in the secure storage component SSC may be used to protect information entering or leaving the secure key management device SKMD via the secure interface I/F.

Figure 2:
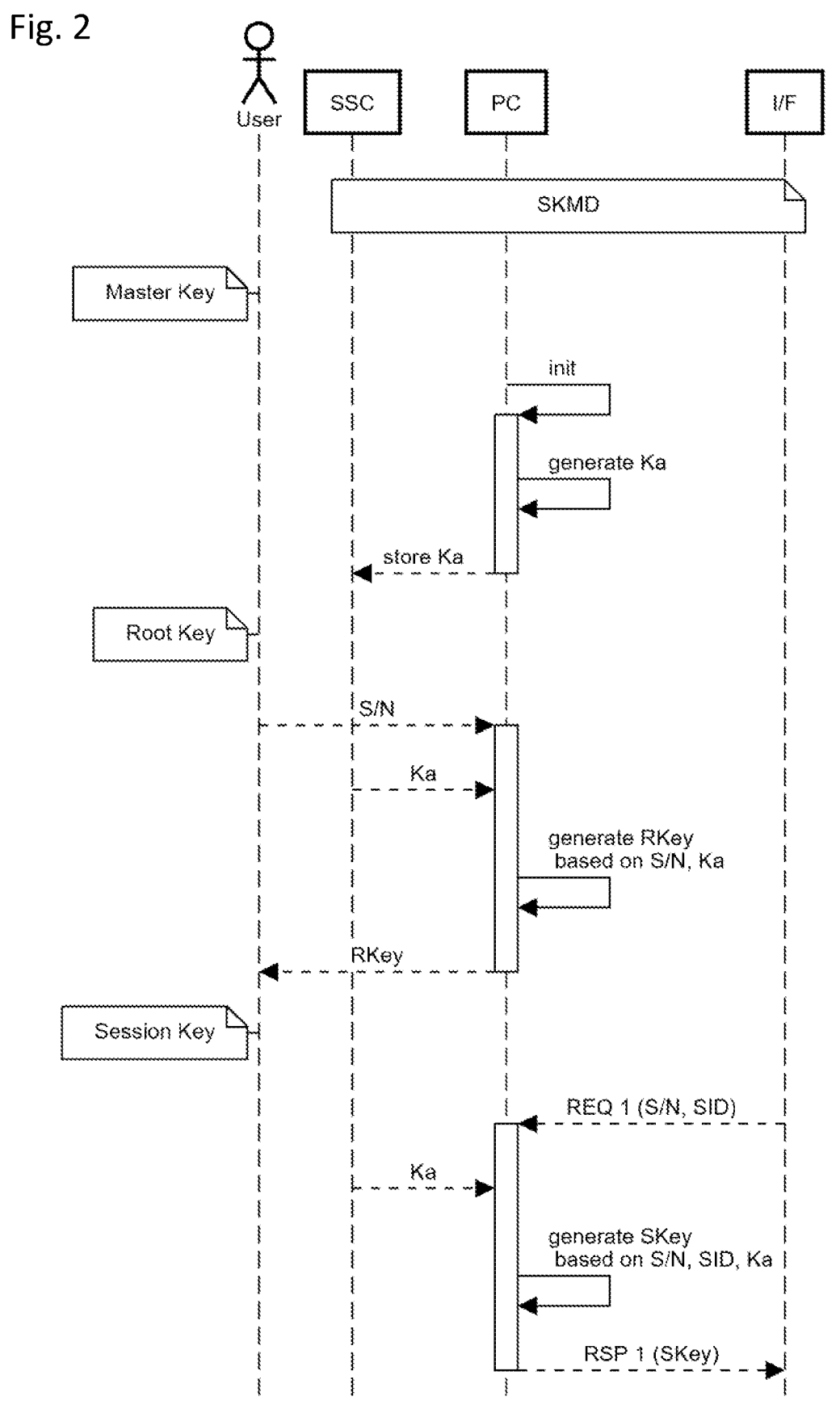

FIG. 2 shows a schematic sequence diagram of steps of various operating methods according to embodiments of the disclosure. FIG. 2 shows both the internal interaction between the components SSC, PC and I/F of the secure key management device SKMD as well as the interaction of the secure key management device SKMD with an external user.

During initialization of the secure key management device SKMD shown in the upper part of FIG. 2, for example by first setting up or booting a network server configured as secure key management device SKMD, the processing component PC generates at least one master key Ka and stores the generated master key Ka in the secure storage component SSC. For example, the processing component may obtain a random or pseudo-random seed value for generation of a secret master key based on a predefined cryptographic function. For improved security, the master key Ka may be changed from time to time as detailed later. In this case, each version of the master key Ka, together with corresponding version data Kn, is stored in the secure storage component SSC of the secure key management device SKMD. Once the secret master key Ka data is securely stored in the secure storage component SSC, the secure key management device SKMD is ready for operation.

In a separate process shown in the middle part of FIG. 2, the user may pre-register a specific end-device with the secure key management device SKMD. For this purpose, the user first provides a unique identifier S/N of the end-device to be registered to the processing component PC. For example, a user may manually enter a serial number of the end-device. Alternatively, a serial number of end-device may be provided automatically at the end of a manufacturing process by the manufacturer of the end-device using a pre-commissioning device as detailed below (not shown in FIG. 2). Such a pre-commissioning device may have a machine-to-machine (M2M) interface directly and securely connected to the secure key management device SKMD.

To generate at least one root key RKey associated with the end-device identified by the provided serial number, the processing component PC retrieves the active secret master key Ka from the secure storage component SSC. Then, based on an appropriate cryptographic function, the root key RKey for the end-device is generated by the processing component PC based on the unique identifier S/N and the active master key Ka.

In a last step, the root key RKey generated by the secure key management device SKMD is provided to the end-device (not shown in FIG. 2). For example, the root key RKey may be communicated back electronically through the M2M interface of the pre-commissioning device for directly programming the root key RKey into the end-device. Thus, no paper trail of the transmitted information needs to be kept during the registration of the end device.

Depending on the security requirements of the specific device and application, the root key RKey and the unique identifier S/N as well as any other security critical data, such as end-device address identifier, may be stored in a secure element (SE) of the end-device. In the case of a relatively low security level, this information may also be stored in a conventional non-volatile memory of the end-device. In this case, a corresponding hash value may be stored in the end-device to avoid any later manipulation of the stored data.

At the end of this process, the end-device is associated with the active master key Ka of the secure key management device SKMD and can be deployed to a customer and/or be used as an end-device in an WAN application as described below in more detail. It may also be linked indirectly to the secure key management device SKMD by means of an additional activation procedure involving a further entity, such as a join server, as detailed below.

During operation of the end-device, the end-device may try to contact a specific application running on an application server of the WAN. Before a corresponding communication channel between the end-device and the application server is established, a network server responsible for routing data packets or the addressed application server may request one or more session key for secure communication with the end-device. As part of this procedure, session keys for securing a communication between the end-device and the network server or the application server, respectively, are generated in a further process, as shown in the lower part of FIG. 2.

Accordingly, the processing component PC of the secure key management device SKMD may receive a first request REQ1 comprising the unique identifier S/N as well as session information SID via the secure interface I/F. The request REQ1 may originate from a join server, which has received a corresponding join request for providing session keys to a network server or application server as described in more detail below. In response to the first request REQ1, the processing component PC will obtain the master key Ka from the secure storage component SSC. Then, based on the unique identifier S/N, the session information SID and the master key Ka, the processing component PC will generate one or more session keys SKey that is specific for the end-device. This key will be provided back to the requesting entity via the secure interface I/F as part of a first response RSP1. In particular, the processing component PC may provide the response RSP1 back to a join server, which in turn will provide the session key SKey to a requesting entity, such as a network server or application server communicating with the end-device.

Attention is drawn to the fact that the master key Ka never leaves the secure key management device SKMD. Moreover, the root key RKey provided to the end-device during pre-registration is not provided via the secure interface I/F to the entity requesting the session key. Thus, the join server obtains no knowledge of the underlying master key or root key. Consequently, even in the case that the join server is compromised, for example hacked, a potential intruder cannot obtain any information regarding the secret master key Ka or the root key RKey used by the end-device.

Before a further embodiment of the present invention is described in more detail, at first a general operation of an exemplary WAN that can be used in remote sensing applications is described below with respect to FIGS. 3 and 4.

Figure 3:
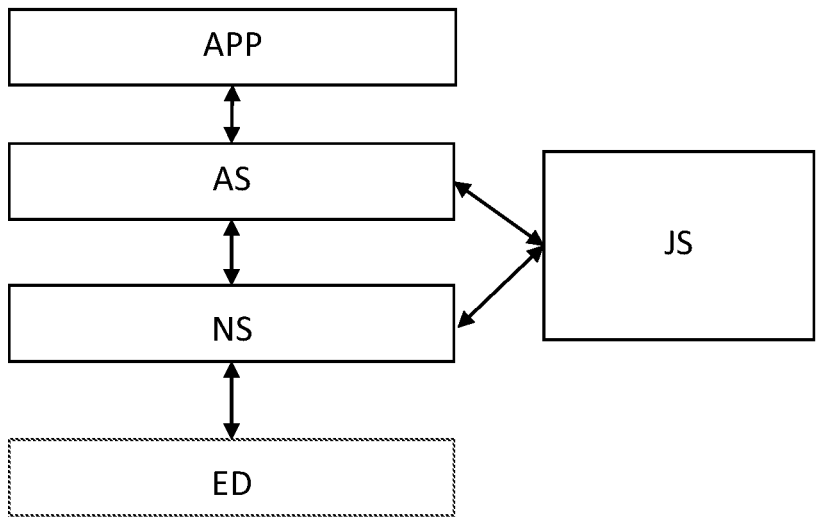
FIG. 3 is a schematic block diagram of a WAN architecture typical for a LoRaWAN system.

FIG. 3 shows each of the participating entities of a LoRaWAN based system. A workflow for the entire process is also described in the section below. Both this illustration and the listed workflow are specified in this section as per LoRaWAN specifications version 1.1, the content of which is included herein.

The system of FIG. 3 comprises an end-device ED, a network server NS, an application server AS, an application App and a join server JS. For the sake of clarity, only one of those entities is shown in FIG. 3. However, in a practical implementation, many instances of each of the described entities may be present.

The end-device ED is a device having a LoRaWAN communication interfaces capable of transporting data through a LoRaWAN communication network. The network server NS is a LoRaWAN communication network provider server that listens for data packets from the end-device ED as transported through the LoRaWAN communication protocol. Upon receiving any data packets, the network server NS further transports the LoRaWAN application data payload contained therein to the application server AS. The application server AS is the server that obtain the application level data from the network server NS and then further transports the data payload to the end application App from where the data is either to be monitored, controlled or otherwise consumed. For example, the application App may be a monitoring application that monitors the operational state of an energy distribution network, or a billing application that queries a number of smart meters acting as end-devices.

The join server JS is a key management server that conventionally manages the distribution of network session keys, i.e. a set of "Network Level" session keys to one or more network servers, and "Application Level" keys also called "Application Session Key" and referred to as "AppS-Key" in the LoRaWAN specification to the one or more application servers AS.

For this purpose, in a conventional set-up, the join server JS, stores one or more root keys, i.e. the initial or base keys. The initial keys that are used as per LoRaWAN specifications version 1.1 are the Network Root Key (NwkKey) and the Application Key (AppKey), which are AES 128-bit keys. These keys are then further used to derive the session keys that are used for securing the transportation of LoRaWAN traffic against cyber-attacks at both the network layer and the application layer of the WAN. Attention is drawn to the fact that, according to the LoRaWAN specifications version 1.0, only a single root key, i.e. the Application Key (AppKey), is used to derive all session keys.

According to the standard, the LoRaWAN join procedure to a LoRaWAN communication infrastructure can happen in one of two ways, called "Over-The-Air-Activation" (OTAA) or "Activation By Personalization" (ABP). The corresponding procedures are described in sections 6.2 and 6.3 of the LoRaWAN 1.1 Specification 2, 2017, LoRa Alliance, Inc., whose contents are included by reference.

During device activation, the end-device ED should be initialized with the following data items:

a. JoinEUI: This is an identifier in the form of an IEEE EUI64 address of the join server JS so that the end-device ED can communicate with the right join server JS. This is only required to be stored inside each of the end-device ED when they want to opt for OTAA.

b. DevEUI: This is an identifier in the form of an IEEE EUI64 address of each of the end-device ED so that the network server NS that is listening to the LoRaWAN communication traffic can identify each of them correctly. This data is required when the end-device ED wants to opt for OTAA, but in ABP it is not required, although this data is recommended to be stored inside each of the end-device ED.

NwkKey: This is the key that is used to derive the "Network session keys", i.e. a set of network level session keys, for example FNwkSIntKey, SNwkS-IntKey and NwkSEncKey in Version 1.1 of the LoRaWAN standard. The network level session keys are used to protect the LoRaWAN communication traffic at the network layer, i.e. communication between the end-device ED and network server NS. This data is not required to be stored inside each of the end-device ED when operating them in ABP mode.

AppKey: This is the key to derive the "Application Level" session key also called "Application Session Key", for example AppSKey in Version 1.1 of the LoRaWAN standard. The Application Session Key is used to protect the LoRaWAN communication traffic at the application layer, i.e. communication between the end-device ED and the application server AS via the network server at the OSI Application Layer 7. This data is not required to be stored inside the end-device ED when operating the end-device ED in ABP mode.

Figure 4:
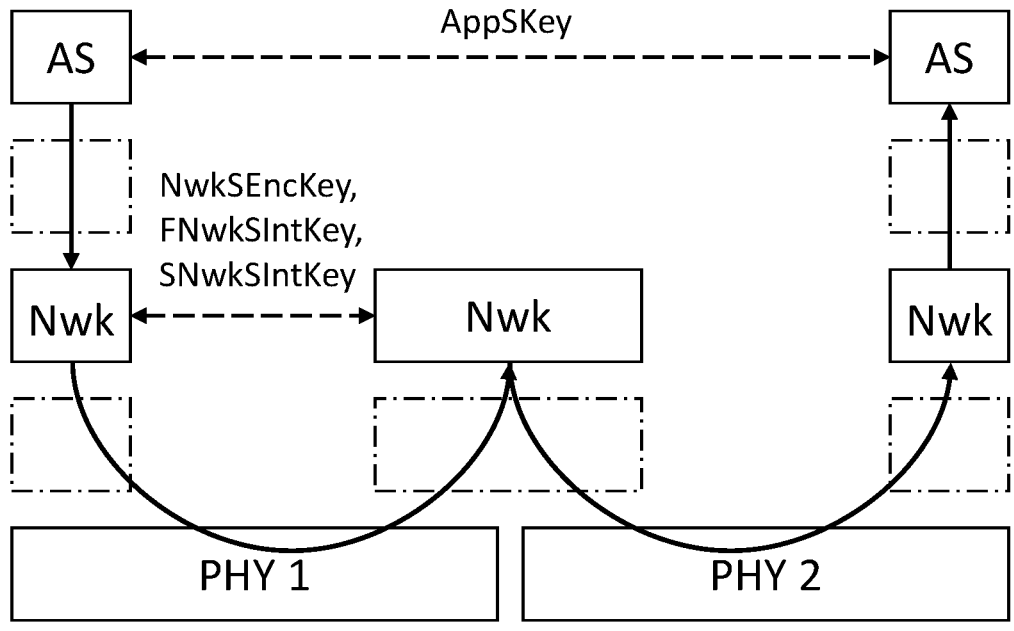
FIG. 4 is a schematic block diagram of a secure communication flow in LoRaWAN entities.

FIG. 4 illustrates this secure communication flow with the help of session keys collocated at each of these below illustrated participating entities of a LoRaWAN based communication system.

In a LoRaWAN communication network, the end-device ED securely communicates with the network server NS with the help of the "Network session keys", i.e. a Forwarding Network session integrity key FNwkSIntKey, a Serving Network session integrity key SNwkSIntKey and a Network session encryption key NwkSEncKey, which are derived from the root Network Key, i.e. NwkKey. The end-device ED thus securely transmits the LoRaWAN data to the network server NS, e.g. by encryption of MAC payloads and commands. Similarly, application level data exchanged between the end-device ED and the application server AS is encrypted. That is to say, the end-device ED performs cryptographic operation at both the network layer, with the help of the "Network session keys", and at the application layer, with the help of the "Application session key".

Upon receiving the LoRaWAN data, the network server NS further transmit the data securely to the application server AS. Please note that in this step, the network server NS does not need to perform any cryptographic operation since the application payload segment of the LoRaWAN data is already encrypted with the help of the "Application Session Key" by each of the end-device ED. Hence, the network server NS may simply forward that LoRaWAN data to the application server AS for its further processing, such as its indigestion, and transmitting it by a communication protocol, for example a secure communication protocol, into the end application APP for either monitoring or control.

It is noted that a LoRaWAN may span multiple physical networks, as also indicated in FIG. 4. For example, a first physical network PHY1 may be a LoRa low power wireless access network, whereas a second physical network PHY2 may be wired core network. In the example depicted in FIG. 4, the network server NS also serves as a gateway between the first physical network PHY1 and the second physical network PHY2. However, this function may also be implemented in a different device, with the network server being placed in either one of the first physical network PHY1 or the second physical network PHY2.

The LoRaWAN standard, including both version 1.0 and 1.1 of the specification, does not specify the method to initialize and securely manage the set of root keys, i.e. NwkKey and AppKey, that are used to generate the session keys—"Network session keys i.e. a set of Network level session keys" and "Application session key" during Over-The-Air-Activation (OTAA) that are later used to secure the LoRaWAN communication traffic. The standard also does not specify mechanisms to securely handle the "Network session keys" and "Application session key". Hence, it does not specify a secure workflow to securely manage the keys described above. It only specifies the use of Secure Elements (SE) and Hardware Security Module (HSM) to securely store them.

However, as recognized by the inventors, the overall workflow for their management, i.e. generation, transportation and update of these root keys and session keys is important for the overall security of the system. A weak workflow in performing these steps could lead to cyber weakness in the LoRaWAN based system. Secure management of these initial set of root keys are the most important aspect towards the overall cyber security management of the system. Accordingly, this disclosure provides methods and systems to securely manage these root keys, and the derived "Network session keys" and "Application session keys".

Figure 5:
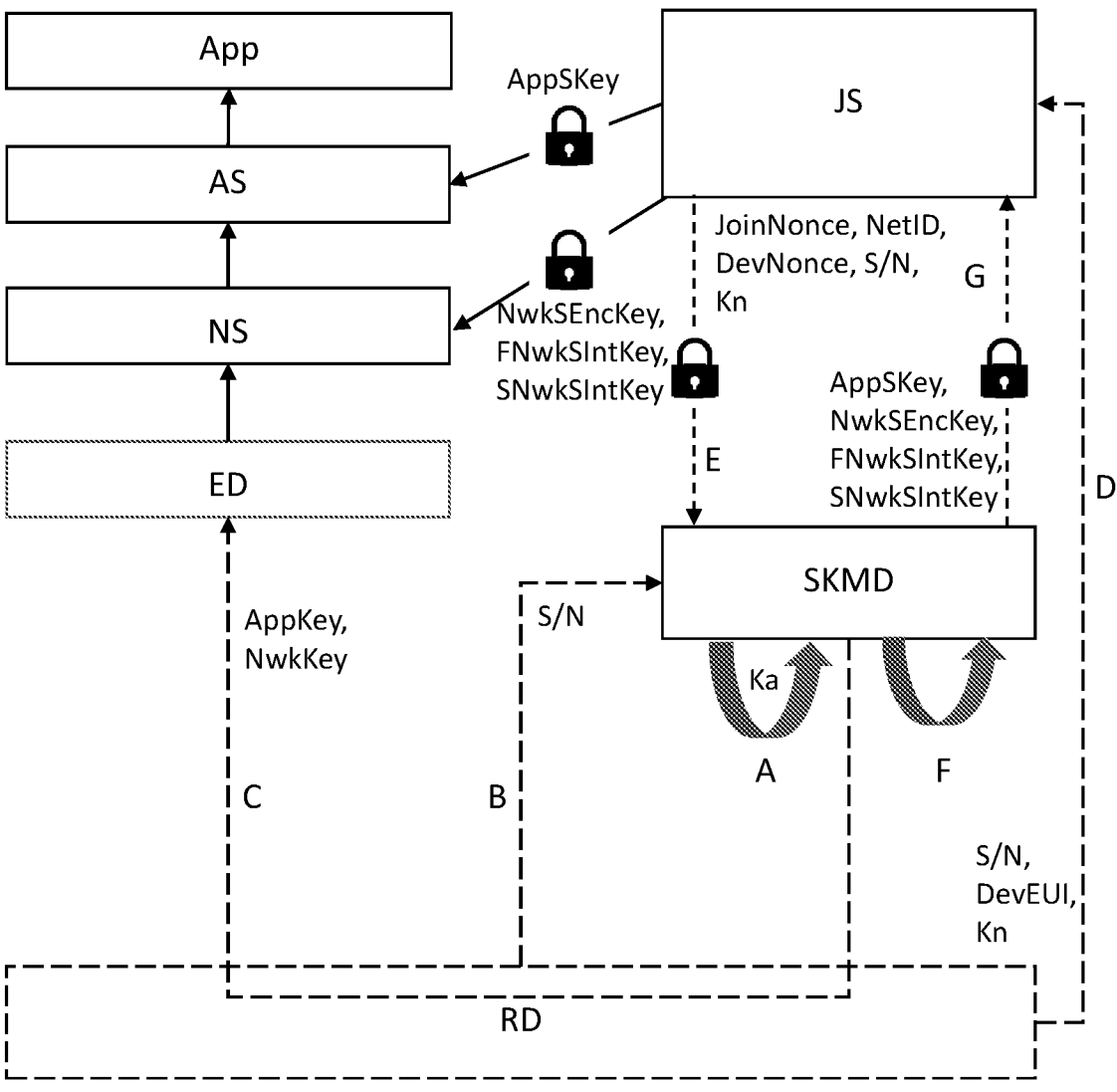
FIG. 5 is a schematic block diagram of a wide area network comprising an authentication system according to an embodiment of the disclosure.
Figure 6A:
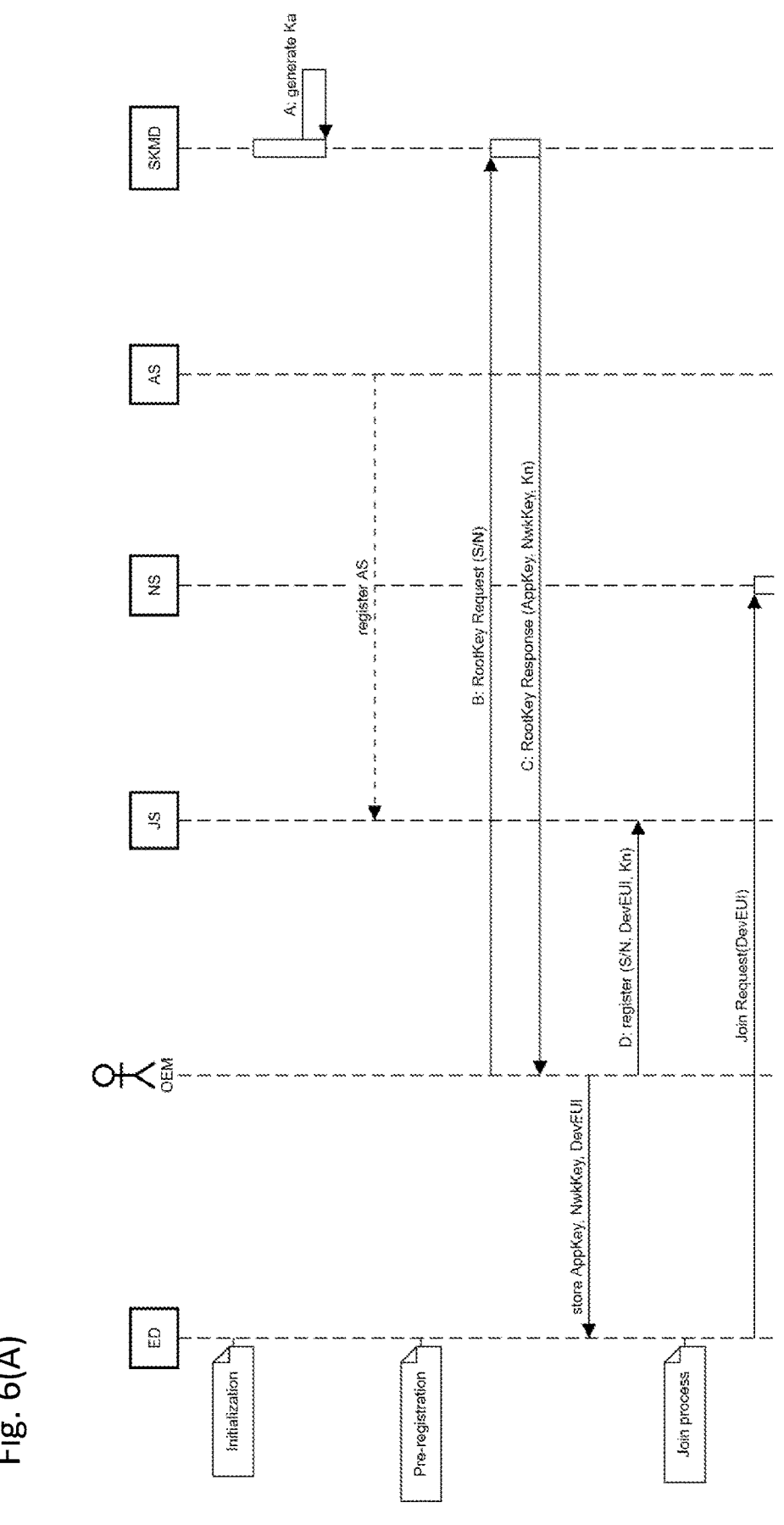
FIG. 6 is a schematic sequence diagram for initialization of a secure key management device, pre-registering and join processing of an end-device in a wide area network according to an embodiment of the disclosure.
Figure 6B:
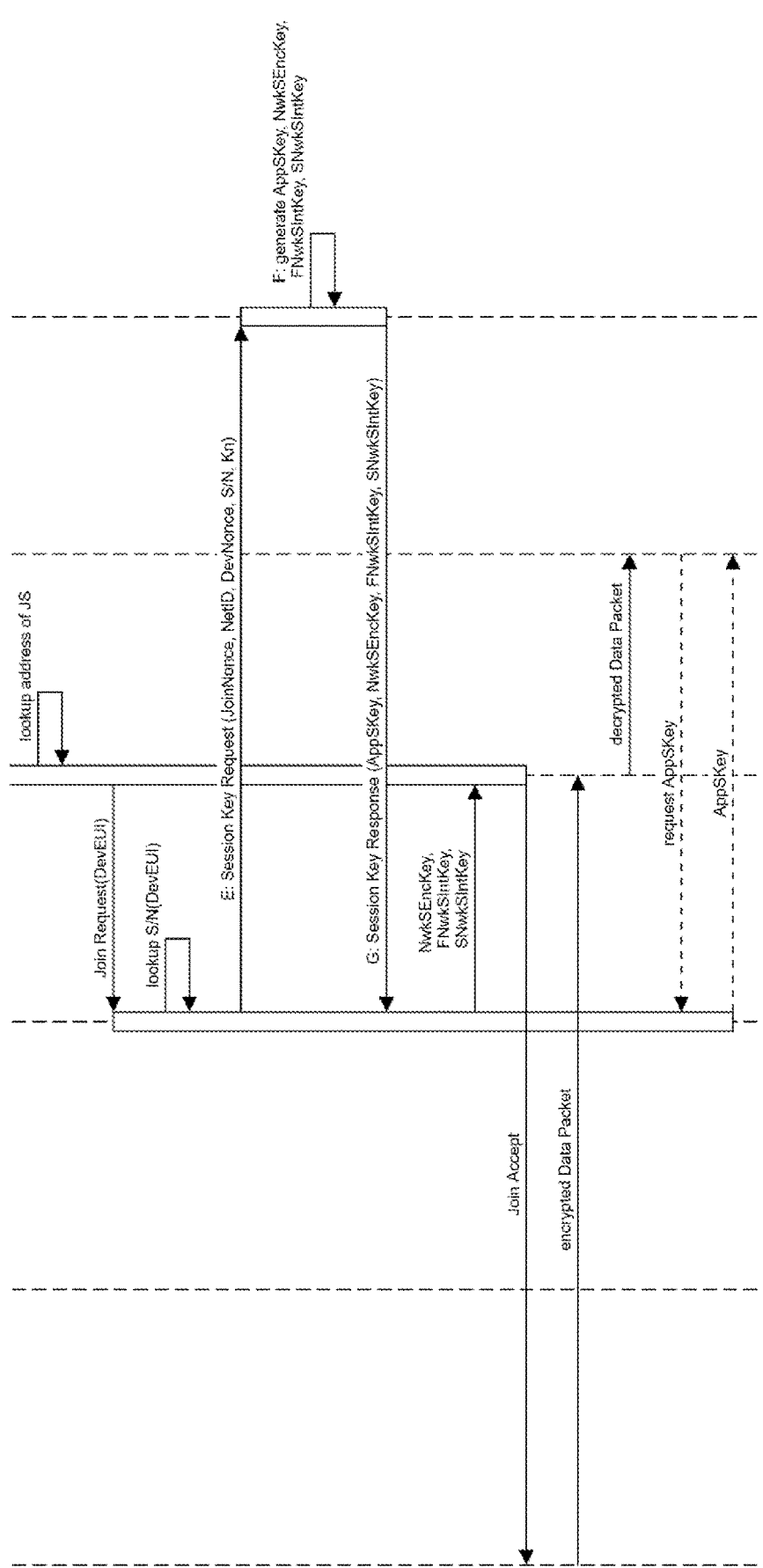

This following section details how the disclosed solution can be applied in a specific example in the context of a LoRaWAN network with respect to FIGS. 5 and 6. The disclosed solution addresses at least some of the challenge mentioned above by introducing another entity called secure key management device SKMD to the LoRa system. This entity handles the secure generation and transportation of the root keys, i.e. NwkKey and AppKey, and their derivative session keys, namely network session keys, i.e. FNwkS-IntKey, SNwkSIntKey and NwkSEncKey, and Application Session Key, i.e. AppSKey.

FIG. 5 illustrates schematically both the set-up of the system, as well as the described workflow comprising steps A to G.

The key generation followed by transmission of the used keys occurs in these below sequenced steps. A precondition and thus a pre-requisite for these steps to successfully achieve its objective is initialization of "JoinNonce", "NetID" and "DevNonce" that needs to be securely pre-generated and pre-stored in the join server JS for each of the end-device ED.

The steps A to F are described below with respect to FIG. 5 with respect to the secure key management device SKMD, which is a distinct, physically separated entity from the other participants of the LoRaWAN system. The individual steps A to G as listed below are being performed by a processing component PC of the secure key management device SKMD, except steps B and E, as illustrated in FIG. 5.

Step A: Upon booting up, the secure key management device SKMD generates and stores a master key Ka. K1 denotes the first version of the master key Ka. The first master key K1 may be stored, together with corresponding version data Kn, for example, in a Hardware Security Module of the secure key management device SKMD. This key K1 is further used for the generation of root keys, i.e. NwkKey and AppKey, which are distinct for each of the end-device ED as further described below. After a certain number of iterative uses of this first master key K1, the secure key management device SKMD generates a second master key K2, which is also stored with corresponding version data Kn by the secure key management device SKMD, and this trend goes on. This certain number can be decided upon the local security policy. Of course, it is also possible to manually force the generation of a new master key, for example after a detected intrusion of other security breach.

Step B: The secure key management device SKMD has an interface through which the serial number of each of the end-device ED can be entered. This can be either entered by any method such as by a human being or by a computerized script that reads these predefined serial number of each of the end-devices ED from any computerized file and enter them inside the secure key management device SKMD.

Step C: For each new end-device ED, a NwkKey and, for end-devices ED according to LoRaWAN specifications version 1.1, also an AppKey are generated based on their serial number and the current active master key Ka and stored in the end-device ED. For example, the NwkKey and AppKey may be stored in a secure element of the end-device ED. Note that neither the master key Ka itself nor its version data Kn is not stored in the end-device ED.

The input parameters, used in the cryptographic key generation function, are:
Active master key Ka
Serial number of each of the end-device, which acts as a device identifier S/N for each of uniquely distinguishing each of the end-device ED.

Hence, for each of the end-devices ED, the key generation function becomes $$NwkKey = F_A(Ka, S/N)$$

$$AppKey = F_B(Ka, S/N),$$

where $F_A$ and $F_B$ are differently chosen any state-of-the-art cryptographic function. The exact function will generally depend on the applicable standard and is not limited by the present disclosure.

Hence, after executing step C, a new end-device ED will contain a distinct and unique NwkKey and AppKey.

Step D: The join server JS also has an interface, through which the serial number of each of the end-device serving as unique identifier S/N, an end-device address identifier DevEUI of the end-device ED within the WAN, and the version data Kn of the master key Ka (but not the master key Ka itself) used to generate the NwkKey and AppKey in step C can be entered. Again, this can be either entered by any method such as by a human being or by a computerized script that reads these predefined serial number of each of the end-device ED from any computerized file and enter them inside the join server JS.

Step E: During the join and activation process, the join server JS requests from the secure key management device SKMD the network session keys, i.e. FNwkS-IntKey, SNwkSIntKey and NwkSEncKey, and the application session Key, i.e. AppSKey. For this purpose, the join server JS uses the DevEUI of the end-device ED provided to the join server JS in the Join Request to find the serial number of the end-device ED and the version data Kn of the master key Ka used for the generation of the end-device's root keys NwkKey and AppKey which were provided to the join server JS in step D. Then, the join server JS provides a Session Key Request comprising the serial number serving as unique identifier S/N of the end-Device ED, the version data Kn of the master key Ka, a join nonce ("Join-Nonce"), a network id ("NetID") and a device nonce ("DevNonce") as described in the LoRaWAN standard. The transportation of the Session Key Request shall be performed through any state-of-the-art secure communication protocol.

Step F: Upon getting the respective values from step E, the secure key management device SKMD generates the network session keys, i.e. FNwkSIntKey, SNwkS-IntKey and NwkSEncKey, and the application session Key, i.e. AppSKey, for the respective end-device ED by using the corresponding LoRaWAN standard specified key generation algorithms using the following steps:

Generation of NwkKey and AppKey using $F_A$ and $F_B$ with the data from step E for end-device ED as described in the join and activation process.

Generation of FNwkSIntKey, SNwkSIntKey, NwkSEncKey, and AppSKey based on "JoinNonce", "NetID", "DevNonce", NwkKey and AppKey.

It is noted that the above steps for generating the NwkKey and AppKey as well as the FNwkSIntKey, SNwkSIntKey, NwkSEncKey and AppSKey can be performed on-the-fly, i.e. without storing the generated key in the secure key management device SKMD, which further increases system security.

Step G: The secure key management device SKMD securely sends to the join server JS the session keys generated in step 0 for the end-device ED in the join and activation process as part of a Session Key Response. The data is transmitted using any state of the art secure communication protocol. The join server JS will forward these session keys as part of a Join Accept to one or more requesting network server NS and/or application servers AS, as appropriate. The join server JS will not keep a local copy of these session keys.

As further shown in FIG. 5, steps B, C and D may be performed by or under the control of a registration device RD of the device manufacturer OEM, which has one or several corresponding interfaces for communication with the end-device ED, the secure key management device SKMD and/or the join server JS. In one embodiment, these interfaces are secure machine-to-machine (M2M) interfaces outside the LoRaWAN network address space and/or communication FIG. 6 shows an exemplary sequence diagram detailing a complete flow for initialization of a secure key management device SKMD, as well as pre-registering and joining of an end-device ED in LoRaWAN. For easier reference, steps A-F described above are marked again in FIG. 6, together with further steps of the disclosed procedure.

The methods described above may be implemented, in parts or as a whole, in software. For this purpose, a data storage device may store instructions that, when executed by at least one processing device of a networked computing device, such as the processing component PC of the secure key management device SKMD, executes steps implementing those parts of the method whose role the computing device has, e.g. the steps performed by the secure key management device SKMD, the join server JS, the registration device RD, the end-device ED, etc.

The embodiments shown in FIGS. 1, 2, 5 and 6 as stated represent exemplary embodiments of the improved devices, systems and methods; therefore, they do not constitute a complete list of all embodiments according to the improved devices, systems and methods. Actual devices, systems and methods may vary from the embodiments shown in terms of arrangements, devices, exchanged messages and parameters for example.

REFERENCE SIGNS

APP end application
AS application server
ED end-device
I/F secure interface
JS joins server
NS network server
OEM device manufacturer PC processing component
SKMD secure key management device
SSC secure storage component
AppKey application root key
AppSKey application session key
DevEUI end-device address identifier
Ka (active) master key
Kn version data (of master key)
NwkKey network root key
NwkSEncKey, FNwkSIntKey, SNwkSIntKey network session key(s)
RKey root key
REQ1 first request
RSP1 first response
SID session information
SKey session key
S/N unique identifier (of end-device)

The invention claimed is:

1. A secure key management device for a long range wide area network (LoRaWAN) comprising an end-device, a network server, an application server, and a join server, the secure key management device comprising:

a secure storage component for storage of secret key information;

a secure interface for securely exchanging data with the join server; and at least one processing component configured to:

generate and store at least one master key in the secure storage component, wherein the secure storage component is distinct and separate from the at least one processing component;

generate, based on the at least one master key and a unique identifier of the end-device, at least one root key, and provide the at least one generated root key to the end-device;

receive, from the join server via the secure interface, a first request comprising the unique identifier of the end-device and session information;

generate, based on the at least one master key stored in the secure storage component, and the unique identifier of the end-device and the session information comprised in the first request, at least one session key; and provide the at least one session key via the secure interface to the join server;

wherein a pre-registration procedure performed before the secure key management device receives the first request comprises generating and providing the at least one root key to the end-device and providing, by the secure key management device, the join server with a registration message comprising the unique identifier of the end-device.

2. The secure key management device of claim 1, wherein the secure key management device and join server are part of an authentication system for authenticating the end-device in the long range wide area network, wherein the authentication system further comprises:

at least one processing component of the join server which is configured to:

receive, from the end-device, a second request comprising address information of the end-device;

provide, via the secure interface to the secure key management device, the first request based on the address information of the second request; and forward the at least one session key received via the secure interface from the secure key management device to at least one of the network server and the application server.

3. The secure key management device of claim 2, wherein the authentication system further comprises:

a registration device, connectable to the end-device and the secure key management device during the pre-registration procedure, wherein at least one processing component of the registration device is configured to perform the following steps during the pre-registration procedure:

determine the unique identifier of the end-device;

provide a third request comprising the unique identifier of the end-device to the secure key management device;

receive the at least one root key provided by the secure key management device; and securely store the at least one root key in the end-device.

4. The secure key management device of claim 3, wherein the at least one processing component of the registration device is further configured to perform the following steps during the pre-registration procedure:

determine an end-device address identifier for addressing the end-device in the wide area network; and store the end-device address identifier in the end-device.

5. The secure key management device of claim 2, wherein the end-device is configured to send a data packet to the network server, the data packet being encrypted on a network layer and on an application layer;

the network server is configured to partially decrypt the data packet on the network layer using at least one network session key received from the join server, and forward the partially decrypted data packet to the application server; and the application server is configured to decrypt the data packet on the application layer using at least one application session key received from the join server.

6. The secure key management device of claim 1, wherein the long range wide area network comprises a low power wireless access network domain comprising the end-device and a core network domain comprising the application server, and wherein the secure interface is configured for exchanging data with the join server outside the low power wireless access network domain and/or the wired core network domain.

7. The secure key management device of claim 1, wherein the secure interface is configured for exchanging data with the join server outside an address space of the LoRaWAN network, and the session information comprises at least one of a join nonce, a network ID and a device nonce.

8. A method for generating session keys for use in a long range wide area network (LoRaWAN) comprising an end-device pre-registered with a secure key management device, a network server, an application server and a join server, the method comprising:

generating, by the secure key management device, based on at least one master key and a unique identifier of the end-device, at least one root key;

performing a pre-registration procedure before receiving a first request from the join server comprising providing the at least one generated root key to the end-device and providing, by the secure key management device, the join server with a registration message comprising the unique identifier of the end-device;

receiving, by the secure key management device from the join server via a secure interface, the first request comprising the unique identifier of the end-device and session information;

generating, by the secure key management device, based on the at least one master key previously generated by at least one processing component of the secure key management device and stored in a secure storage component of the secure key management device, and the unique identifier of the end-device and the session information comprised in the first request, at least one session key, wherein the secure storage component is distinct and separate from the at least one processing component; and providing, by the secure key management device, the generated at least one session key via the secure interface to the join server.

9. The method of claim 8, wherein at least one network session key and at least one application session key is generated and provided to the join server by the secure key management device.

10. The method of claim 8, wherein the step of generating the at least one session key comprises:

generating, by the secure key management device, at least one root key of the end-device based on at least one first cryptographic function using the at least one master key stored in the secure key management device and the unique identifier of the end-device comprised in the first request; and generating, by the secure key management device, the at least one session key based on at least one second cryptographic function using the at least one generated root key and the session information comprised in the first request.

11. The method of claim 8, wherein the end-device is pre-registered with the secure key management device before the step of receiving the first request in the pre-registration procedure, the pre-registration procedure comprising:

generating, by the secure key management device, the at least one master key and storing the at least one master key within the secure key management device;

generating, by the secure key management device, based on the at least one master key and the unique identifier of the end-device provided to the secure key management device, at least one root key; and providing the at least one generated root key to the end-device.

12. The method of claim 11, wherein the step of generating the at least one master key is repeated after a predetermined condition;

during the pre-registration procedure, version data related to the master key used for generating the at least one root key is provided to the end-device; and the first request received from the join server further comprises the version data.

13. The method of claim 12, further comprising:

receiving, by the join server from the end-device, a second request comprising address information of the end-device;

providing, by the join server via the secure interface to the secure key management device, the first request based on the address information of the second request; and forwarding the at least one session key received from the secure key management device via the secure interface to at least one of the network server and the application server.

14. The method of claim 13, wherein the address information of the second request comprises an end-device address identifier of the end-device, the method further comprising:

during the pre-registration procedure, providing, to the join server, the end-device address identifier as the unique identifier of the end-device;

mapping, by the join server, the end-device address identifier comprised in the second request to the unique identifier of the end-device; and generating, by the join server, the first request based on the mapping of the end-device address identifier to the unique identifier.

15. A data storage device storing instructions that, when executed by at least one processing device of a networked computing device, implements the steps for generating session keys for use in a long range wide area network (LoRaWAN) including an end-device pre-registered with a secure key management device, a network server, an application server and a join server, the steps comprising:

generating, by the secure key management device, based on at least one master key and a unique identifier of the end-device, at least one root key;

performing a pre-registration procedure before receiving a first request from the join server comprising providing the at least one generated root key to the end-device and providing, by the secure key management device, the join server with a registration message comprising the unique identifier of the end-device;

receiving, by the secure key management device from the join server via secure interface, the first request comprising the unique identifier of the end-device and session information;

generating, by the secure key management device, based on the at least one master key previously generated by at least one processing component of the secure key management device and stored in a secure storage component of the secure key management device, and the unique identifier of the end-device and the session information comprised in the first request, at least one session key, wherein the secure storage component is distinct and separate from the at least one processing component; and providing, by the secure key management device, the generated at least one session key via the secure interface to the join server.

* * * * *